United States Patent
Visagie

[11] 4,034,200
[45] July 5, 1977

[54] ARTICLE OF FURNITURE

[76] Inventor: Gerhardus Johannes Cornelius Visagie, 9 Amatola Road, Verwoerdburg, South Africa

[22] Filed: Dec. 11, 1975

[21] Appl. No.: 639,976

[30] Foreign Application Priority Data

Apr. 6, 1975  South Africa ............ 75/3601
Dec. 12, 1974  South Africa ............ 74/7931

[52] U.S. Cl. ............... 219/218; 99/339; 219/518
[51] Int. Cl.² ............................ H05B 1/00
[58] Field of Search ........ 219/201, 218, 214, 443, 219/445, 446, 455, 457, 458, 464, 465, 518; 108/95; 99/339, 340

[56] References Cited

UNITED STATES PATENTS

| | | | |
|---|---|---|---|
| 1,120,758 | 12/1914 | Stirn | 219/218 |
| 1,158,475 | 11/1915 | Fox | 219/218 |
| 2,439,133 | 4/1948 | Jenkins | 219/218 |
| 2,548,932 | 4/1951 | Ball | 219/218 |
| 2,897,330 | 7/1959 | Hopkins | 219/218 |
| 3,636,299 | 1/1972 | Stewart, Jr. | 219/218 X |

Primary Examiner—C. L. Albritton
Attorney, Agent, or Firm—Marshall & Yeasting

[57] ABSTRACT

A rotatable heating unit for supporting food receptacles is convertible to a rotatable unheated unit, and comprises a base, and a circular support rotatably mounted on said base, having a depressed central surface. Means are provided for heating said depressed central surface and thereby heating food receptacles supported thereon. A removable cover substantially fills the depressed central portion of said support to form with the surrounding portion of said support a substantially level unheated surface for supporting food receptacles. Means are provided for spacing said cover from said depressed central surface.

11 Claims, 4 Drawing Figures

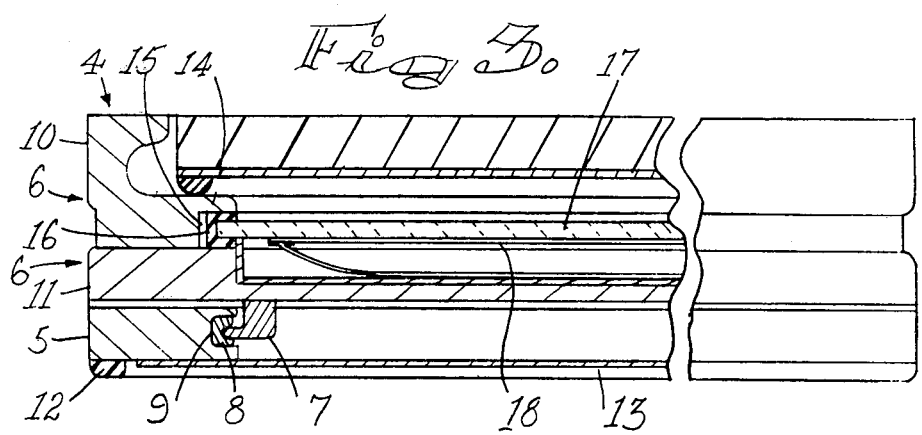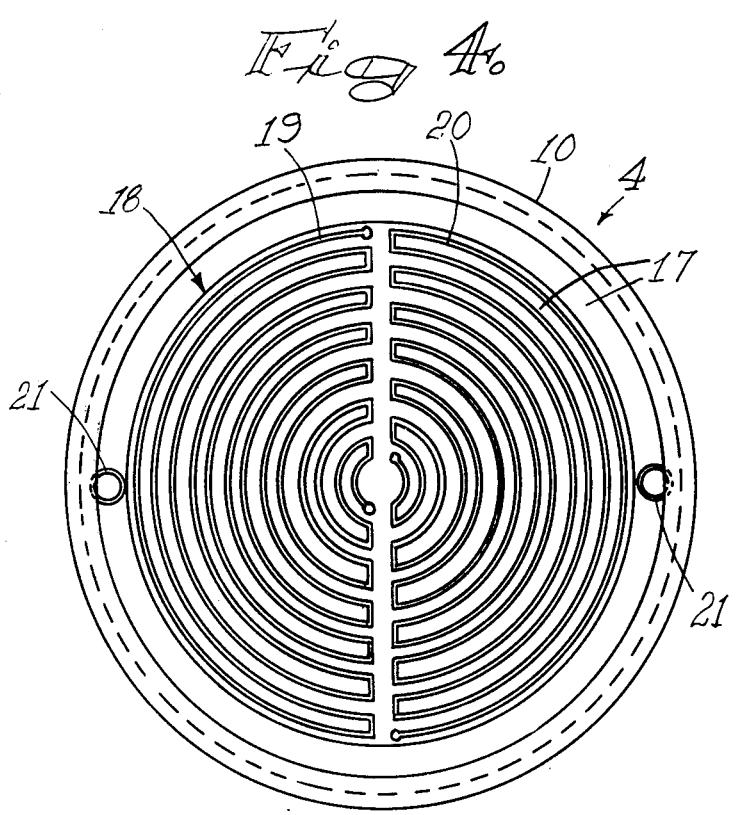

ARTICLE OF FURNITURE

BACKGROUND OF THE INVENTION

This invention relates to an article of furniture and more particularly an article of furniture in the nature of a table or the like.

The problem of maintaining food being served at a table at a required temperature is a well known one and many arrangements such as for example so called hot trays, specially insulated dishes, mobile food warming trollies etc. have hitherto been devised in attempts to overcome this problem.

As far as the applicant is aware none of the existing arrangements has thusfar succeeded in completely overcoming the problem or the associated problems arising from the actual serving of the food itself and it is an object of the present invention to provide means which the applicant believes will at least minimize the combined effects of these problems.

SUMMARY OF THE INVENTION

According to the invention a food and the like serving unit is provided including a rotatable operative surface and means for controlling the temperature of at least part of the surface.

By locating a receptacle with food to be served or food already served on or near the operative surface, the food may be maintained at a suitable temperature for as long as required. On rotation of the operative surface relative to the person to be served, different locations on the surface may conveniently be brought into reach of the person being served.

The temperature controlling means may comprise heating and/or cooling means.

Preferably the temperatures of different parts of the surface are individually controlled.

With this arrangement the same surface may hence be utilised to keep different types of foods at different preferred temperatures.

The area may be heated and/or cooled in any suitable manner but preferably it is heated and/or cooled by electrically operated means.

The surface may of course also be heated and/or cooled by a heating or cooling medium such as heated or cooled water for example.

Preferably the means includes a thermostat for controlling the temperature of the surface.

In one form of the invention the heating means may comprise a heating element carried in or below the operative surface of the unit.

In this arangement a sliding contact is preferably utilised for carrying electricity from an electricity supply source to the element.

Preferably the operative surface is supported in a cradle rotatably carried on a stationary base.

In this form of the invention the rotatable cradle is preferably provided with at least one electric power outlet.

Such a power outlet may for example be utilised when employing other electrical equipment such as toasters etc. with the unit.

Preferably also the operative surface is of substantially circular configuration in plan view.

In one form of the invention the operative surface comprises a sheet of a suitable material such as glass for example sealingly receivable in the unit.

Preferably a plurality of crescent shaped food containers adapted to be carried on the operative surface are also provided. These containers are preferably provided with self-parking lids.

In one form of the invention one or more serving decks associated with the operative surface may be provided.

In one form of the invention these decks may be adapted to be carried on the operative surface in superimposed relationship thereto.

In another form of the invention these decks may be rotatably carried above and/or below the operative surface with means being provided for raising and lowering the decks and/or operative surface.

In another form of the invention the cooling means may include a container adapted to carry a cooling medium.

Further according to the invention a table or the like is provided adapted to receive a food and the like serving unit as described above.

Thus, for example, the table may include a substantially centrally located recess for housing the unit.

In one form of the invention the unit may form an integral part of the table.

In another form of the invention the unit may be removably mountable in or on the table.

In this form of the invention the unit may be utilised in the Table when serving food there from or it may be utilised in a different location unassociated with the table.

Preferably the recess includes a lid with the arrangement such, that when in position in the recess, the upper face of the lid is flush with the operative face of the table irrespective or whether the unit is contained in the recess or not.

In one form of the invention the lid may be rotatable relative to the table.

With the lid in position on the recess a table similar to the conventional arrangements is hence provided but with the advantage of rotational capability of a portion of the table top.

Preferably the lid comprises two semicircular halves with a small central hole for facilitating removal of the lid and for allowing an escape route for unwanted heat in the recess.

Where the unit is removable it preferably includes an axially directed peripherally extending projection defining a circumferentially extending finger engageable gripping formation for facilitating its removal from the table.

For safety reasons at least one switch may be provided in the electrical circuit feeding current to the element which switch is adapted to be actuated by the weight of the unit and/or the lid.

When the unit is accordingly removed from the recess the said switch may ensure that the electric current in any exposed electrical components is switched off. Similarly another switch may be employed to ensure that when the lid is in position in the recess no current will flow to the heating and/or cooling means.

In one form of the invention means may be provided for adjusting the position of the unit in the recess.

It is also contemplated that, if necessary, the table or the like may also include a plurality of heating and/or cooling zones disposed along the periphery of the table or the like to coincide with the different serving places at the table or the like. By locating the plates or the like into which the food has been served in such areas the temperature of the food may be maintained at the preferred degree during the actual meal itself.

It will be appreciated that the article of furniture according to the invention provides an arrangement whereby the problem of serving and maintaining food at a pedetermined temperature is overcome or at least minimized.

BRIEF DESCRIPTION OF THE DRAWINGS

FIG. 3 is a diagrammatic side elevation, partly in section, of the rotatable unit of the table of FIG. 1;

FIG. 4 is a plan view of the unit of FIG. 3.

Figure 1:
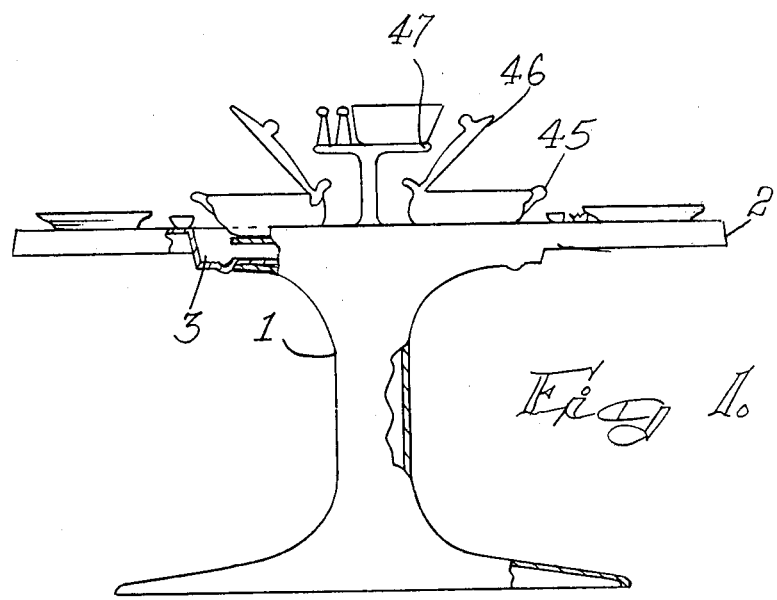
FIG. 1 is a diagrammatic side elevation partly in section of a table and unit according to one embodiment of the invention.

In the embodiment shown in FIGS. 1–6 a table 1 with a top 2 is provided which includes a substantially centrally located circular recess 3 adapted to house a rotatable unit 4.

Unit 4 includes an annular base 5 which is fixed relative to top 2 as for example by means of screws or the like (not shown).

An annular cradle 6 is carried for rotation on base 5 by means of arms 7 engaging rollers 8 carried in an annular groove 9 in base 5.

Cradle 6 is constituted by two interconnected annular elements comprising an upper ring 10 and lower ring 11.

Base 5, which includes all along its periphery a protective insulating strip of material 12, is enclosed from below by means of a cover plate 13.

Upper ring 10 includes an annular lip formation 14 which with lower ring 11 defines an annular groove 15 which houses a heat insulating sealing ring 16 which in turn carries a circular sheet 17 of a heat conducting material.

The underside of sheet 17 has an electrically operated heating member 18 fused thereto. As can be seen from FIG. 4 heating member 18 is constituted by two heating elements 19 and 20 each of which is formed into a plurality of parallel spaced semi-circular interconnected loops. Elements 19 and 20 are connected to a supply of electricity by means of a sliding contact similar to that utilised in the embodiment illustrated in FIGS. 7 and 8 and which will be described in more detail below. Two thermostats 21 are incorporated in the circuitry of elements 19 and 20.

The said supply of electricity is also responsible for feeding electricity to a pilot light 22 (see FIG. 5) housed in upper ring 10 of cradle 6.

Also included in the said circuitry is a micro switch 23 (see FIG. 6) which is carried in a recess in cradle 6 and which may be actuated from above via a resiliently flexible member 24 extending over the upper end of the said recess to switch off the current to the said circuitry.

A circular lid 25 is adapted to sit in the bore of upper ring 10 with the arrangement such that when in position therein the upper face of lid 25 is flush with the upper end 26 of ring 10 which in turn is flush with the upper face of table top 2.

Lid 25 includes along its lower periphery a protective strip 27 which actuates switch 23 via member 24 as a result of the weight of lid 25 when the latter is placed in position in the bore of ring 10. A screw 28 extending through the bottom of the said recess may be utilized to adjust the position of switch 23 in the recess so as to adjust the sensitivity of switch 23.

Figure 8:
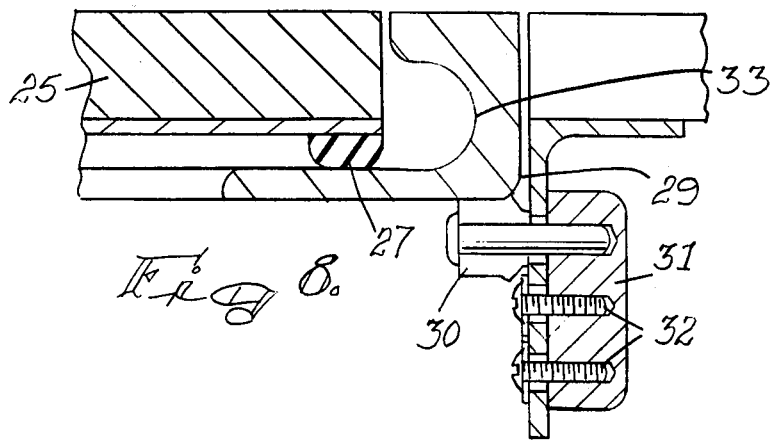
FIG. 8 is a similar view showing a part of the arrangement of FIG. 7 in more detail.
Figure 7:
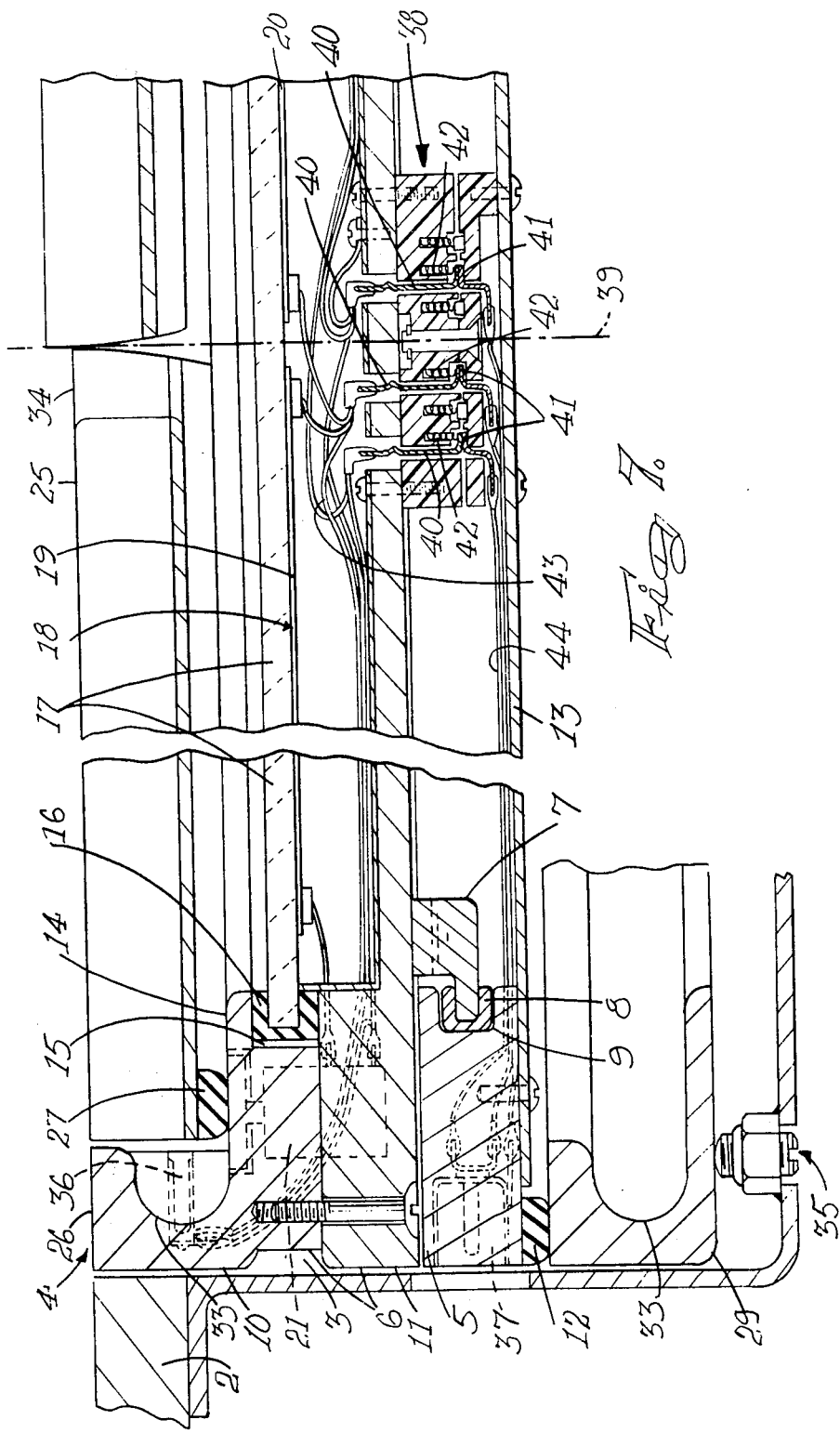
FIG. 7 is a diagrammatic vertical section of the top of a table of another embodiment of the invention.

In the second embodiment shown in FIGS. 7 and 8 components corresponding to those in the first embodiment shown in FIGS. 1-6 are indicated by the same reference numbers.

The main difference between the two arrangements is that in the second embodiment the rotatable unit 4 is removably received in the recess 3 of the table.

A further difference is that the second embodiment includes a dummy ring 29 of similar diameter as that of ring 10, which is usually carried in the bottom of recess 3 (see FIG. 7) but which is adapted, when unit 4 has been removed from recess 3, to be rotatably received in the mouth of recess 3 in a manner for its upper face to be flush with that of table top 2 (see FIG. 8). For this purpose recess 3 is adapted removably to receive a plurality of pin and roller assemblies 30 each of which fits into a hole in a support 31 which is secured to the wall of recess 3 by means of screws 32 in such a manner that the height of the support relative to the wall is adjustable.

Dummy ring 29 is adapted to receive lid 25 in the conventional manner so that with unit 4 removed the table 1 will include a central rotatable portion which may be utilized in a conventional manner.

Both rings 10 and 29 include an annular circumferentially extending groove 33 defining a finger engageable gripping formation by means of which the ring may be handled, rotated, etc.

Also, for the sake of facilitating the removal of the lid 25, it is diametrically split into two semi-circular halves collectively defining a small cnetrally located finger engageable aperture 34.

Other modifications in the embodiment shown in FIG. 7 include a screw operatable height adjusting arrangement 35 disposed in the base of recess 3 and two electric plug-in points 36 and 37 provided in unit 4.

As regards the electric sliding contact mechanism referred to above this comprises a device 38 concentrically mounted relative to the centre line 39 around which cradle 6 rotates.

Device 38 in essence comprises three electricity conducting members 40, which are rotatable with ring 10 and which are held in sliding contact with three electricity conducting members 41 by means of springs 42. Members 40 are connected by means of conduits 43 to elements 19 and 20, thermostat 21, plug-in point 36, and pilot light 22 and micro-switch 23 (not shown in FIGS. 7 and 8). Members 41 again are connected by means of conduits 44 to plug-in point 37 through which the electric power is conducted to unit 4.

It will be appreciated that the unit 4 of the second embodiment may be utilized as a rotatable hot tray in a location other than in the recess 3 of table 1. In such an instance plug-in point 37 may simply be connected to a power supply point different to that provided for table 1.

Figure 2:
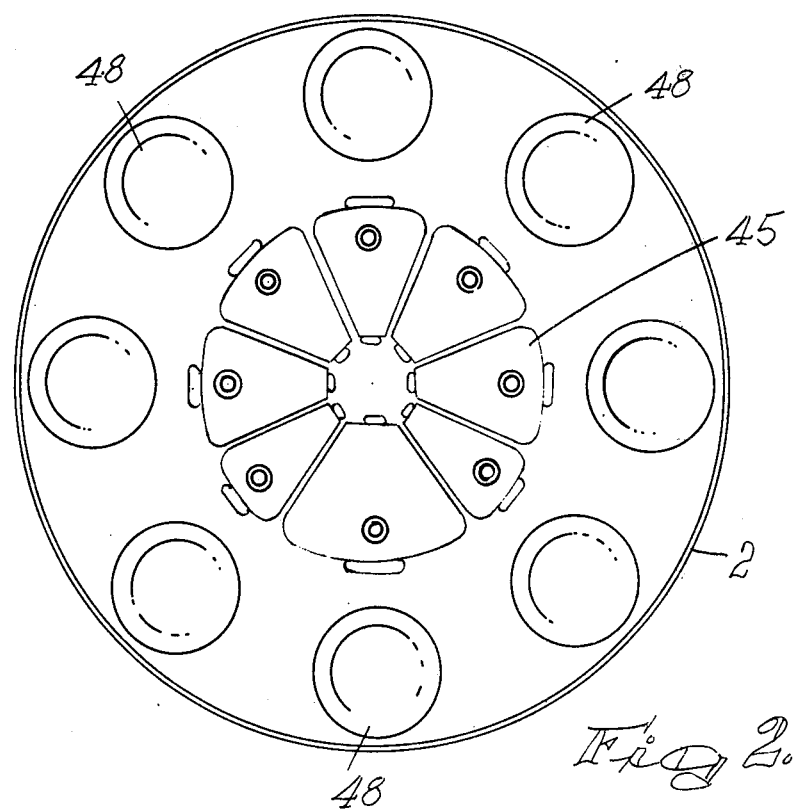
FIG. 2 is a diagrammatic plan view of the arrangement of FIG. 1.
Figure 5:
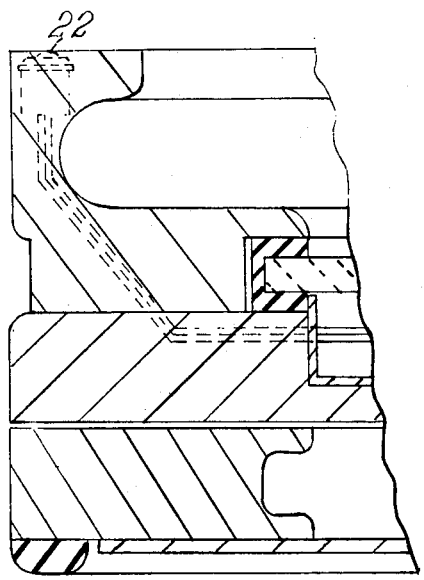
FIGS. 5 and 6 are diagrammatic vertical sections showing parts of the arrangement of FIG. 3 in more detail.
Figure 6:
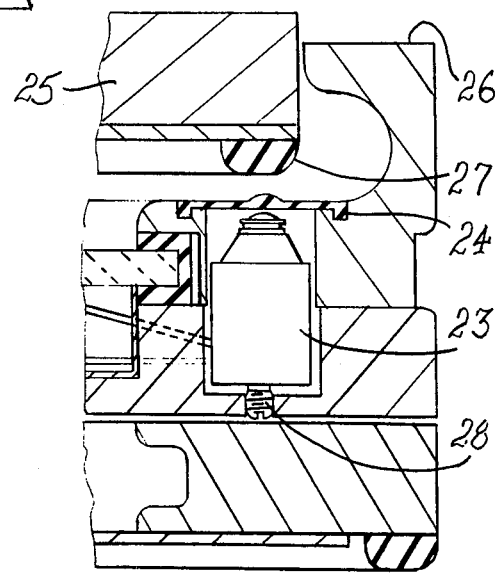

Further details of the invention are shown in FIGS. 1 and 2. These include a set of food receptacles 45 each of which is of crescent shape so that they may be arranged on sheet 17 in side-by-side abutting relationship. Each receptacle 45 includes a self parking lid 46. Other details include a heat insulated stand 47 on which food may be placed out of reach of the influence of the heating unit 4.

It will be appreciated that with a table and heating unit according to the invention many variations in detail are possible without departing from the scope of the appended claims. Thus, for example each of the conventional serving places 48 (see FIG. 2) may be heated (or cooled if required) by elements located in or on top of the table top, the temperatures of such elements preferably being individually controlled.

Other alternative arrangements could include the following:

a. supporting the rotatable cradle on and between adjustable castors located in recess 3, and/or, b. disposing the heating and/or cooling elements along the inside of recess 3.

I claim:

1. A rotatable heating unit for supporting food receptacles, which is convertible to a rotatable unheated unit, comprising a base, a circular support rotatably mounted on said base, having a depressed central surface, means for heating said depressed central surface and thereby heating food receptacles supported thereon, a removable cover which substantially fills the depressed central portion of said support and comprises a substantially level unheated surface for supporting food receptacles, and means for spacing said cover from said depressed central surface.

2. A table having a substantially centrally located recess, and a rotatable heating unit according to claim 1 located in said recess.

3. The table of claim 2 including means for adjusting the position of the unit in the recess.

4. A table according to claim 2 wherein the depth of the recess is at least as great as the vertical height of the rotatable heating unit.

5. A table according to claim 4 wherein the cover is substantially flush with the top of the table.

6. A table according to claim 2 wherein the rotatable heating unit is removable.

7. A table according to claim 6 provided with auxiliary means for rotatably supporting the cover when the rotatable heating unit has been removed.

8. A table according to claim 7 wherein the auxiliary means comprises and auxiliary circular support having a depressed central portion which is substantially filled by the cover, and means for rotatably supporting said auxiliary support substantially flush with the top of the table.

9. A rotatable heating unit according to claim 1 wherein the cover comprises two semi-circular halves defining together a centrally located finger engageable hole.

10. A rotatable heating unit according to claim 1 wherein the heating means is electrical, and the unit comprises a switch which is normally biased to its closed position, for supplying current to the heating means and which is arranged to be held open by the weight of the cover when the cover is in place.

11. A rotatable heating unit according to claim 1 wherein the depressed central portion of the support has a surrounding radially-extending finger engageable groove.

* * * * *

UNITED STATES PATENT AND TRADEMARK OFFICE
CERTIFICATE OF CORRECTION

PATENT NO. : 4,034,200
DATED : July 5, 1977
INVENTOR(S) : GERHARDUS JOHANNES CORNELIUS VISAGIE It is certified that error appears in the above-identified patent and that said Letters Patent are hereby corrected as shown below:

In item [30] Foreign Application Priority Data:

"Apr. 6, 1975" should be - -June 4, 1975- -.

"Apr. 18, 1975  South Africa .....75/2493" should be added.

Column 2, line 34 "or" should be - -of- -.

Column 4, line 40 "cnetrally" should be - -centrally- -.

Signed and Sealed this

Sixth Day of February 1979

[SEAL]

Attest:

RUTH C. MASON
*Attesting Officer*

DONALD W. BANNER
*Commissioner of Patents and Trademarks*